United States Patent
Bafna

(10) Patent No.: US 8,977,888 B1
(45) Date of Patent: Mar. 10, 2015

(54) SUPPORTING LIVE MIGRATION OF VIRTUAL MACHINE COMPONENTS WITH SCSI-3 PERSISTENT RESERVATION FENCING ENABLED

(71) Applicant: Symantec Corporation, Mountain View, CA (US)

(72) Inventor: Mukesh Bafna, Pune (IN)

(73) Assignee: Symantec Corporation, Mountain View, CA (US)

( * ) Notice: Subject to any disclaimer, the term of this patent is extended or adjusted under 35 U.S.C. 154(b) by 155 days.

(21) Appl. No.: 13/685,503

(22) Filed: Nov. 26, 2012

(51) Int. Cl.
*G06F 11/00* (2006.01)
*G06F 11/14* (2006.01)

(52) U.S. Cl.
CPC .................................. *G06F 11/1415* (2013.01)
USPC ......................................................... 714/4.11

(58) Field of Classification Search
CPC ............ G06F 11/2028; G06F 11/2046; G06F 11/2035; G06F 11/2025; H04L 29/14
USPC ......................................................... 714/4.11
See application file for complete search history.

(56) References Cited

U.S. PATENT DOCUMENTS

| | | | |
|---|---|---|---|
| 7,272,674 B1* | 9/2007 | Nandi et al. ..................... | 710/38 |
| 7,590,737 B1* | 9/2009 | Chen et al. ..................... | 709/226 |
| 7,631,066 B1* | 12/2009 | Schatz et al. .................. | 709/224 |
| 7,953,890 B1* | 5/2011 | Katkar et al. .................. | 709/245 |
| 2005/0278465 A1* | 12/2005 | Qi .................................... | 710/36 |
| 2013/0246666 A1* | 9/2013 | Vemuri et al. .................. | 710/15 |
| 2014/0040410 A1* | 2/2014 | McDowell et al. ........... | 709/212 |

\* cited by examiner

*Primary Examiner* — Yair Leibovich
(74) *Attorney, Agent, or Firm* — Brill Law Office; Jeffrey Brill

(57) ABSTRACT

Reservation conflicts are resolved in a clustering and storage system with SCSI-3 PR fencing enabled. For each specific node, all paths to shared storage are registered with a unique key. Only registered nodes can access the shared storage, and only one reservation can exist amidst multiple registrations. A command failure with a reservation conflict resulting from an attempt to access the shared storage is detected. In response, it is determined whether the specific node is registered with its unique key. If so, it is determined that the node is not fenced off from the shared storage, and the reservation conflict is to be resolved. To do so, the node is re-registered for all paths to the shared storage with the node's unique key. The failed command is then re-started. If the node is not registered, it is determined that the node is fenced off.

20 Claims, 5 Drawing Sheets

SUPPORTING LIVE MIGRATION OF VIRTUAL MACHINE COMPONENTS WITH SCSI-3 PERSISTENT RESERVATION FENCING ENABLED

TECHNICAL FIELD

This disclosure pertains generally server virtualization and clustering and storage, and more specifically to supporting live migration of virtual machine components between hosts in a clustering and storage environment with SCSI-3 persistent reservations enabled.

BACKGROUND

Clusters are groups of computers that use groups of redundant computing resources in order to provide continued service when individual system components fail. More specifically, clusters eliminate single points of failure by providing multiple servers, multiple network connections, redundant data storage, etc. Clustering systems are often combined with storage management products that provide additional useful features, such as journaling file systems, volume management, multi-path input/output (I/O) functionality, etc. For example, some storage management products such as Veritas Volume Manager support multipathed storage devices, in which a virtual disk device is made available to initiators of I/O, wherein multiple physical paths exist between the virtual disk and the underlying physical storage.

Problems can arise in a cluster from the failure of interconnection components between nodes. A condition called split brain occurs when independent nodes in a cluster become communicatively disconnected from each other, and each falsely assumes that the other is no longer running. The resulting condition can be described as a fence existing between the nodes, wherein there is no communication through the fence. As a result, the node on each side of the fence assumes it has exclusive access to resources including shared storage. To solve the problem of split brain, the node(s) on one side of the fence or the other should be taken offline, or at least denied access to the shared storage. A technique known as I/O fencing can be used to prevent uncoordinated access to the shared storage, and thus mitigate the risks associated with split brain. I/O fencing allows write access for the node(s) on one side of the fence (known as the active cluster) and blocks access to the shared storage from the node(s) on the other side of the fence (that is, the nodes that are not members of the active cluster).

SCSI-3 Persistent Reservations (SCSI-3 PR) is a feature of SCSI-3. (SCSI-3 is a version of the SCSI (Small Computer System Interface) standard for physically connecting and transferring data between computers and peripheral devices, such as hard disks and tape drives.) SCSI-3 PR supports providing multiple nodes with access to a given storage device while simultaneously blocking access for other nodes, and is thus useful in the context of I/O fencing in a clustered environment utilizing shared storage. SCSI-3 PR uses a concept of registration and reservation. Computer systems register with a given SCSI device, and only registered systems can hold a reservation to issue commands to the particular device. Only one reservation can exist amidst multiple registrations. Under SCSI-3 PR, a computer can be blocked from accessing a storage device by removing its registration. SCSI-3 PR reservations are persistent across SCSI bus resets or computer system reboots. In the case of shared storage, a shared storage device can be comprised of multiple underlying SCSI devices, which logical volume management functionality in the clustering and storage management system virtualizes to appear to computer systems as a single storage device. This allows configuration under SCSI-3 PR such that only registered systems can write to the shared storage device.

Virtualization of computing devices can be employed in clustering and in other contexts. One or more virtual machines (VMs or guests) can be instantiated at a software level on physical computers (host computers or hosts), such that each VM runs its own operating system instance. Just as software applications, including server applications such as databases, enterprise management solutions and e-commerce websites, can be run on physical computers, so too can these applications be run on VMs, which can function as servers in a cluster. Some environments support the ability to move guests (VMs) from a first host computer to a second host computer, often with no downtime for the guest operating system and applications. In other words, a running ("live") VM can be migrated between nodes in the cluster.

A running VM can be migrated from a source host computer to a target host computer in a clustering environment that utilizes I/O fencing under SCSI-3 PR. When this occurs, the running VM and its components and applications are being moved between host computers, each of which has a separate registration with the shared storage. Prior to the migration, the VM runs on the source computer system, and any attempts the VM makes to access the shared storage are made from the source computer system. Thus, the source computer system is the initiator of the attempts to access the shared storage. After the migration, the VM runs on the target computer system, which from this point on is the initiator of any attempts the VM makes to access the shared storage. In other words, the migration of the VM causes an initiator change, which in turn causes a reservation conflict. In practice, the reservations conflict causes I/O attempts (or other SCSI commands) made by the target computer system to the shared storage to fail, causing applications running on the migrated VM to fault. This results in application downtime.

It would be desirable to address this issue.

SUMMARY

Reservation conflicts are resolved in a clustering and storage system that supports registration, persistent reservations and input/output (I/O) fencing (for example, a clustering and storage system with SCSI-3 PR fencing enabled). All paths to the shared storage of the clustering and storage system are registered for a specific computer (node), with a key unique to the specific node. Each computer (node) in the cluster can be registered with its own unique key. The keys unique to specific nodes can be stored at a clustering and storage system wide level. The multiple registered nodes can form a membership, wherein only registered nodes are able to access the shared storage. For example, the established membership can be set to Write Exclusive Registrants Only (WERO), wherein only registered nodes are able to write to the shared storage. A reservation is established amongst the membership to access the shared storage, wherein only one reservation can exist amidst multiple registrations.

A command failure with a reservation conflict (such as an I/O failure or other SCSI command failure) resulting from an attempt to access the shared storage from a specific node is detected. The reservation conflict can occur, for example, as a result of the live migration of a VM between nodes. Responsive to detecting the command failure with reservation conflict, it is determined whether the specific node is registered with the shared storage with its unique key. Responsive to determining that the specific node is registered with the shared storage with its unique key, it is determined that the specific node is not fenced off from the shared storage. In that case, in order to resolve the reservation conflict, the specific node is re-registered for all paths to the shared storage with the specific node's unique key. The failed command (e.g., the failed I/O operation) is then re-started.

On the other hand, responsive to determining that the specific node on which the command failure occurred is not registered with the shared storage with its unique key, it is determined that the specific node is fenced off from the shared storage. In that case, the clustering and storage system performs its default I/O fencing functionality.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
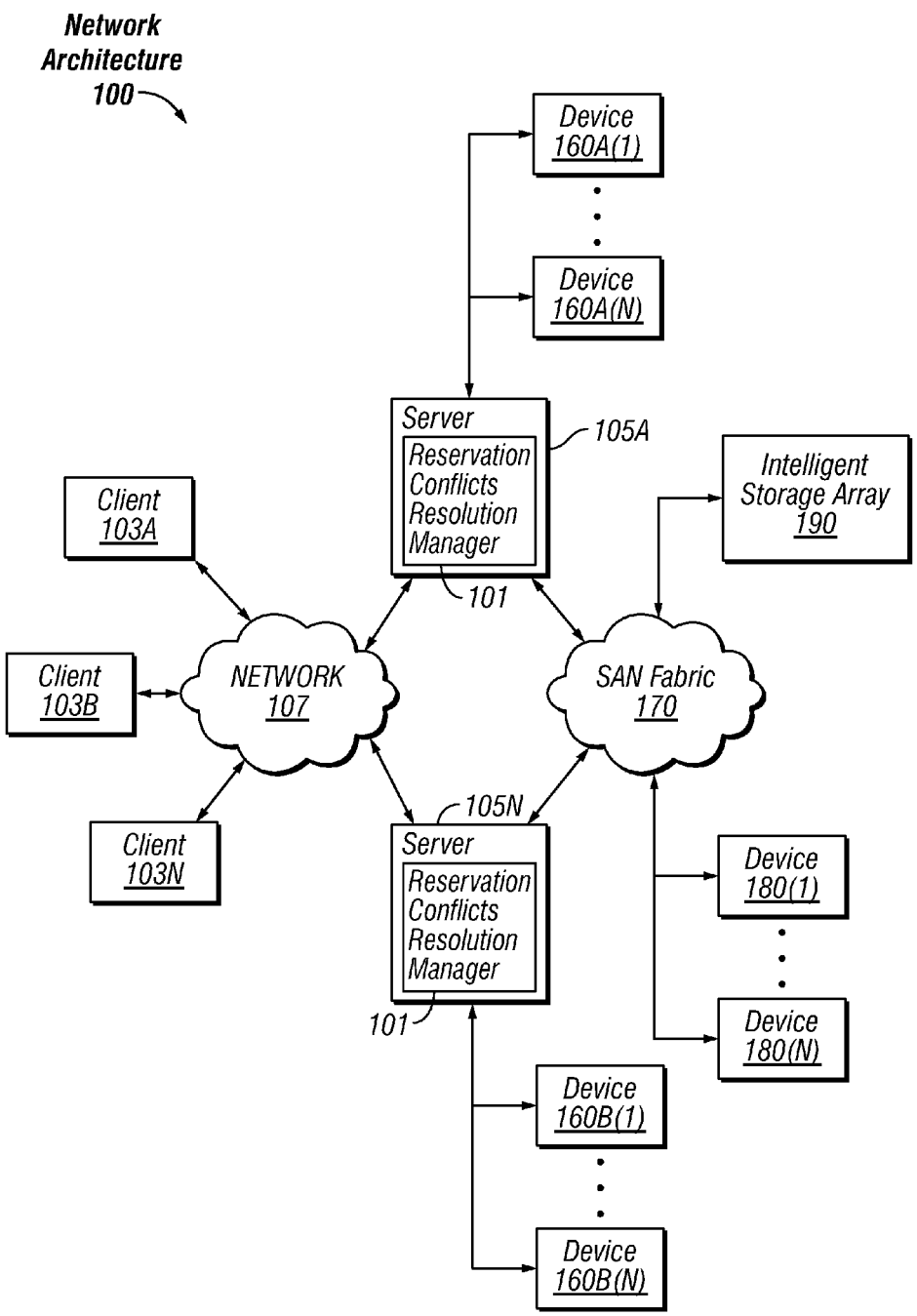
FIG. 1 is a block diagram of an exemplary network architecture in which a reservation conflicts resolution manager can be implemented, according to some embodiments.

FIG. 1 is a block diagram illustrating an exemplary network architecture 100 in which a reservation conflicts resolution manager 101 can be implemented. In the illustrated network architecture 100, client systems 103A, 103B and 103N, as well as servers 105A and 105N, are communicatively coupled to a network 107. A reservation conflicts resolution manager 101 is illustrated as residing on servers 105A and 105N, but in other embodiments the reservation conflicts resolution manager 101 can reside on more, fewer or different computers 210 as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190.

Although FIG. 1 illustrates three clients 103A-N and two servers 105A-N as an example, in practice many more (or fewer) computers can be deployed. In one embodiment, the network 107 is in the form of the Internet. Other networks 107 or network-based environments can be used in other embodiments.

Figure 2:
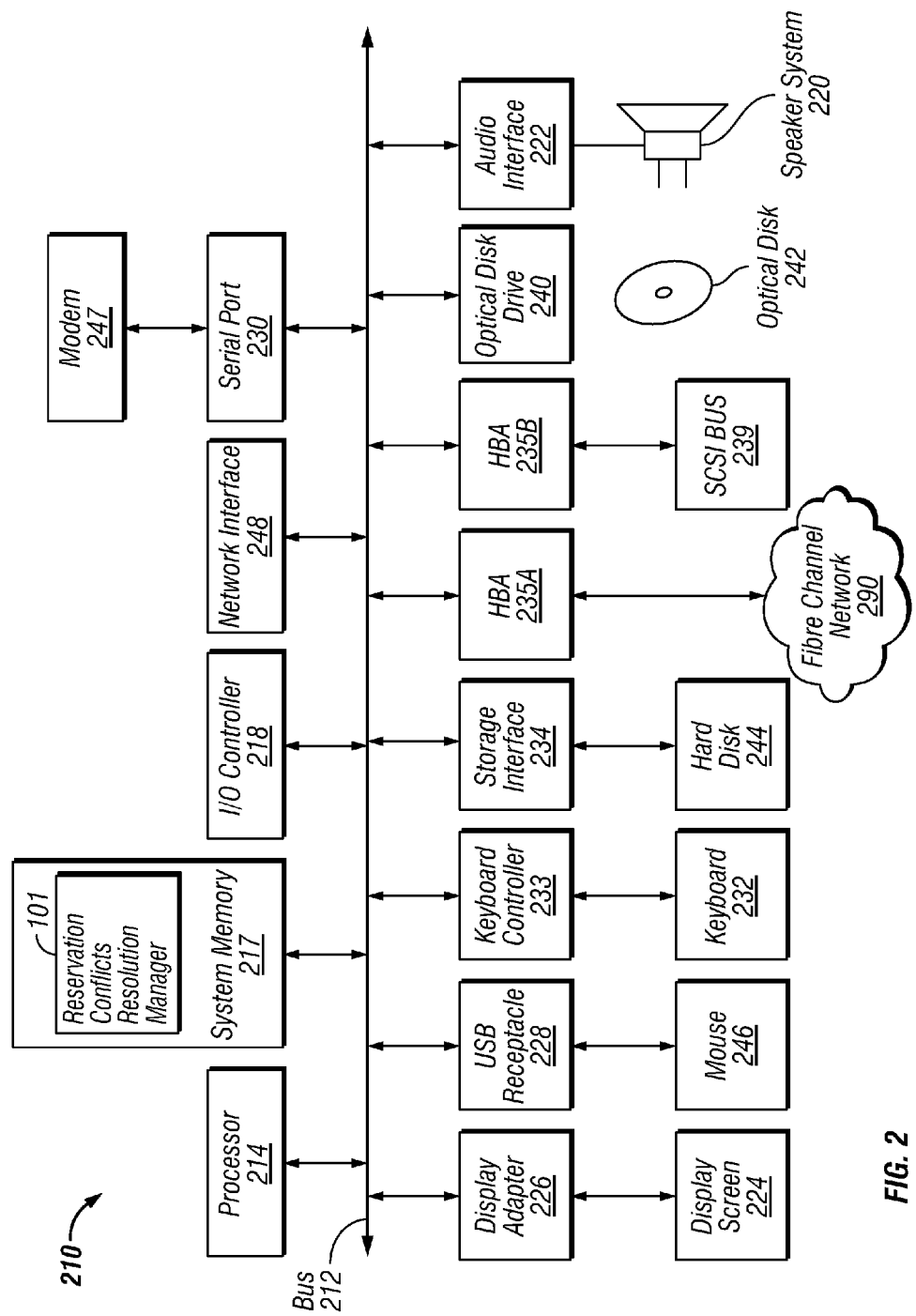
FIG. 2 is a block diagram of a computer system suitable for implementing a reservation conflicts resolution manager, according to some embodiments.

FIG. 2 is a block diagram of a computer system 210 suitable for implementing a reservation conflicts resolution manager 101. The clients 103 and servers 105 illustrated in FIG. 1 can be in the form of computers 210 such as the one illustrated in FIG. 2. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the reservation conflicts resolution manager 101 is illustrated as residing in system memory 217. The workings of the reservation conflicts resolution manager 101 are explained in greater detail below in conjunction with FIGS. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3A:
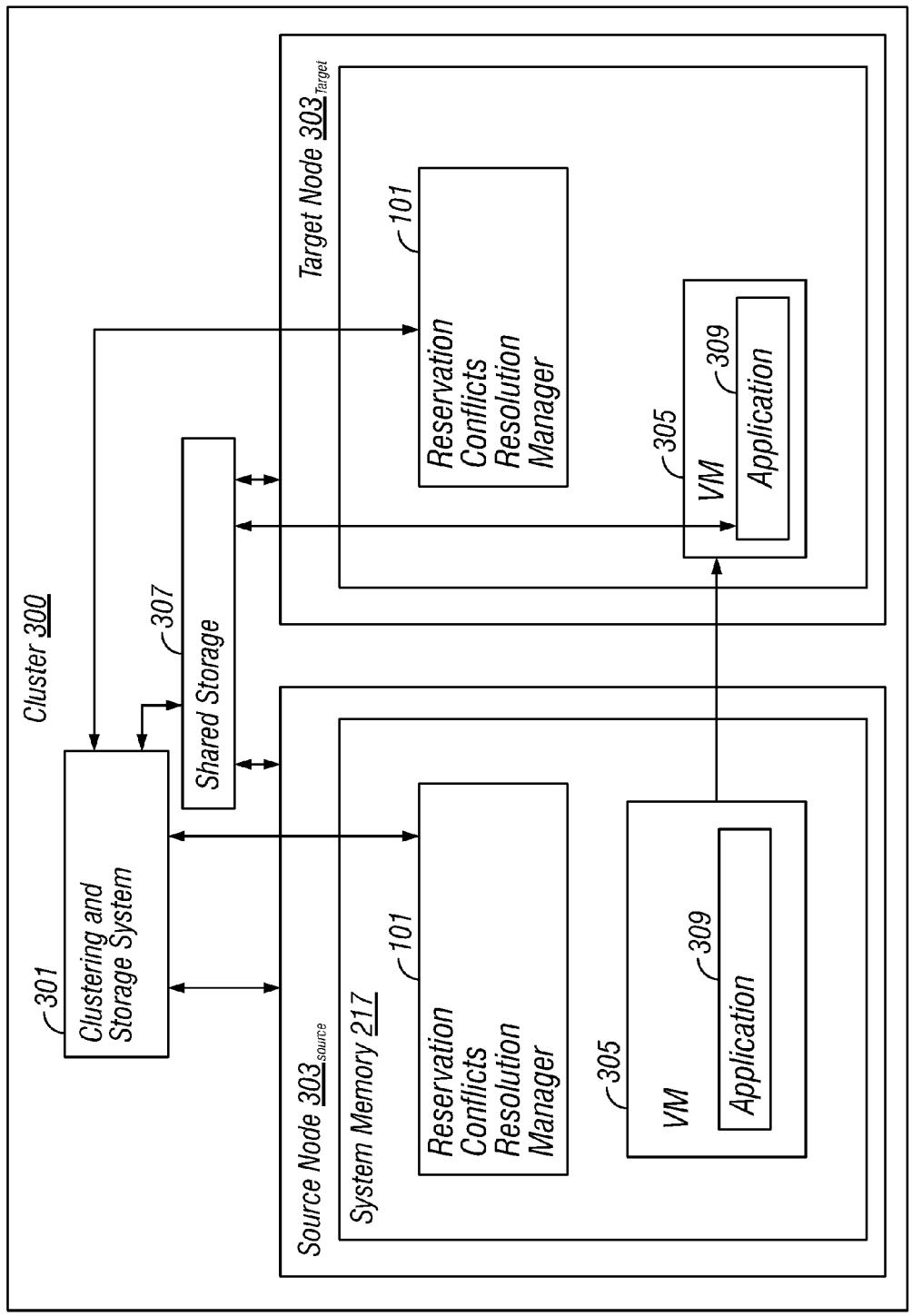
FIG. 3A is a block diagram of the operation of a reservation conflicts resolution manager, according to some embodiments.

FIG. 3A illustrates the operation of a reservation conflicts resolution manager 101, according to some embodiments. FIG. 3A illustrates an instance of a reservation conflicts resolution manager 101 running on each one of multiple nodes 303 (computer systems) of a cluster 300, wherein each node is in the form of a physical computer system 210. It is to be understood that the functionalities of the reservation conflicts resolution manager 101 can reside on a server 105, client 103, or be distributed between multiple computer systems 210, including within a cloud-based computing environment in which the functionality of the reservation conflicts resolution manager 101 is provided as a service over a network 107. It is to be understood that although a reservation conflicts resolution manager 101 is illustrated in FIG. 3A as a single entity, the illustrated reservation conflicts resolution manager 101 represents a collection of functionalities, which can be instantiated as a single or multiple modules as desired. It is to be understood that the modules of the reservation conflicts resolution manager 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the reservation conflicts resolution manager 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

FIG. 3A illustrates a cluster 300 instantiated in the context of a clustering and storage system 301 utilizing shared storage 307. The cluster 300 of FIG. 3A is implemented in conjunction with a storage environment that supports SCSI-3 PR, and the shared storage 307 is instantiated in the form of one or more SCSI devices. Note that although the shared storage 307 is described herein as if it were a single storage device, in practice it is typically implemented with multiple underlying hardware devices, which are managed by the clustering and storage system 301 so as to appear as a single storage device to computer systems 210 accessing the shared storage 307. The clustering and storage system 301 of FIG. 3A supports live migration of VMs 305 (guests) between nodes 303 (host computers). For efficiency of illustration and explanation, the clustering and storage system 301 is illustrated as a centralized component. It is to be understood that, in practice, the clustering and storage system 301 contains components that are distributed throughout the cluster 300.

Although FIG. 3A illustrates a cluster 300 of only two nodes 303, it is to be understood that a cluster 300 can contain more (and in some embodiments many more) than two nodes 303. Each node 303 can be instantiated as a physical host computer 210, for example of the type illustrated in FIG. 2. In some embodiments, the cluster 300 is implemented using Veritas Storage Foundation High Availability (SFHA) or Veritas Storage Foundation Cluster File System High Availability (SFCFSHA), although other embodiments can be implemented in the context of other clustering and storage management environments.

FIG. 3A illustrates a VM 305 being live migrated from the first (source) node $303_{source}$ to the second (target) node $303_{target}$. An application 309 which is monitored by the clustering and storage system 301 runs on the VM 305. As explained above, conventionally the live migration of the running VM 305 between nodes 303 results in a SCSI-3 PR reservations conflict, such that attempts to access the shared storage from the target node $303_{target}$ after the migration of the VM 305 fail, causing the monitored application 309 running on the migrated VM 305 to fault. As explained in detail below, the reservation conflicts resolution manager 101 detects and resolves such reservation conflicts, thereby preventing failure of monitored applications 309, and the downtime of the applications 309 that would result.

Figure 3B:
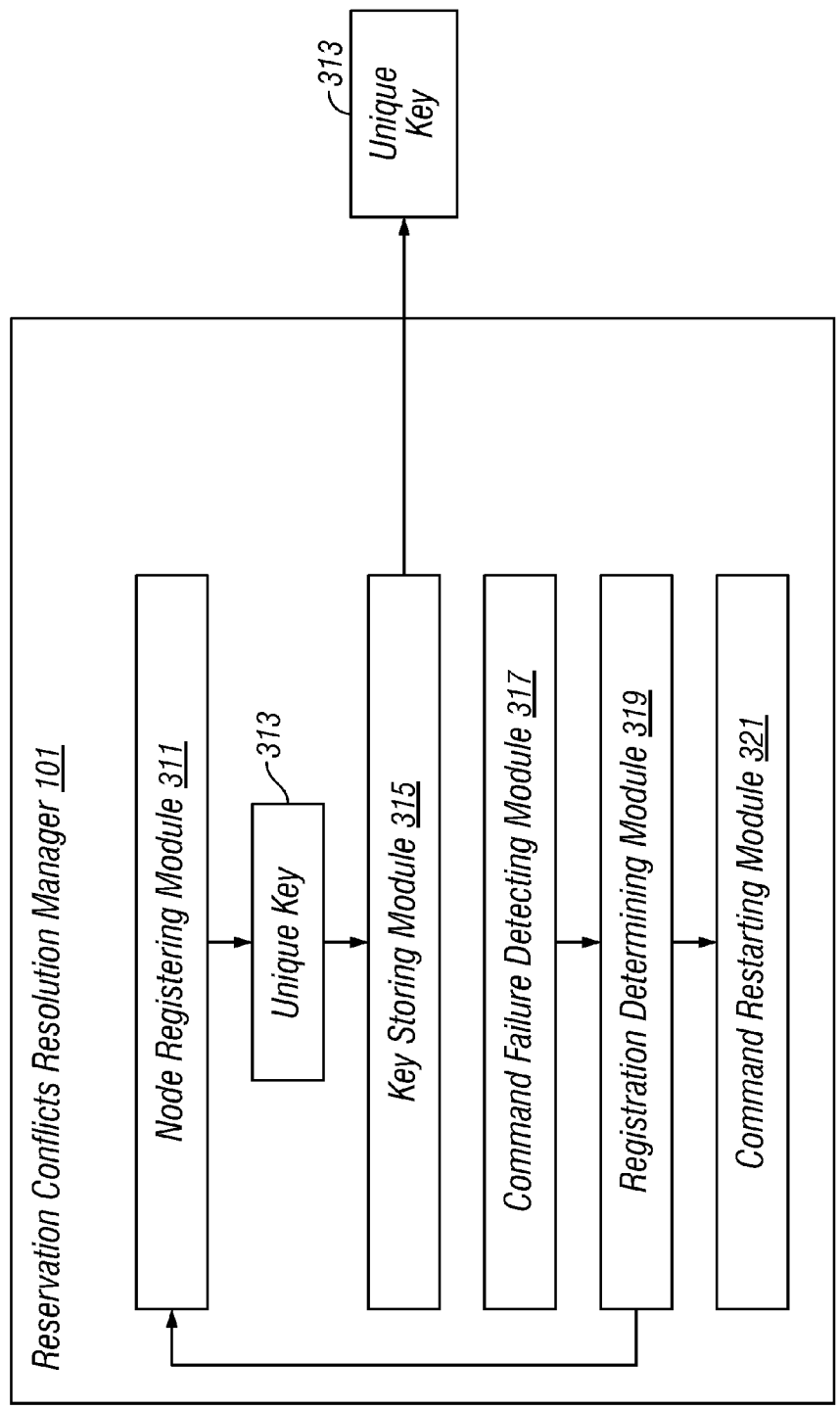
FIG. 3B is a block diagram of the modules of a reservation conflicts resolution manager, according to some embodiments.

Turning to FIG. 3B, the modules of the reservation conflicts resolution manager 101 are illustrated in more detail. A node registering module 311 of the reservation conflicts resolution manager 101 running on a given node 303 uses SCSI-3 PR functionality to register a unique key 313 for the node 303 for all paths to the shared storage 307. Because a reservation conflicts resolution manager 101 can run on each node 303 of the cluster 300, this results in every participating node 303 in cluster 300 being registered with its own unique key 313 through all paths to the shared storage 307. As noted above, only registered nodes 303 can have a reservation to access the storage 307. More specifically, multiple nodes 303 registering keys 313 form a membership and establish a reservation, typically set to Write Exclusive Registrants Only (WERO). The WERO setting enables only registered nodes 303 to perform write operations. For a given device, only one reservation can exist amidst numerous registrations. In one embodiment, the node registering module 311 registers a single unique key 313 for the given node 303 for all paths to the shared storage 307. In other words, in such embodiments a key 313, which is unique to the given node 303, is used for that given node 303 for all underlying SCSI devices making up the shared storage 307. In another embodiment, the node registering module 311 registers a separate unique key 313 for the given node 303 for each separate underlying SCSI device which is part of the shared storage 307.

A key storing module 315 of the reservation conflicts resolution manager 101 running on a given node 303 stores the unique key(s) 313 for that node 303. The key storing module 315 can use functionality provided by the clustering and storage system 301 to store keys 313 at a cluster 300 level. For example, in embodiments that utilize SFHA or SFCFSHA, the keys 313 are stored in a dmp-node structure (a dmp-node is a Veritas Volume Manager (VxVM) created multipathed disk device). In other embodiments, the specific implementation mechanics of cluster level storage of keys 313 varies, depending upon the specific clustering and storage system 301 in use. The node registering module 311 can subsequently use the stored key 313 corresponding to the specific node 303 it runs on to register that node 303 when new paths to the shared storage 307 get added, paths get restored, etc.

A command failure detecting module 317 of the reservation conflicts resolution manager 101 detects when a command directed to the shared storage 307 made by a computer 210 in the cluster 300 fails with a reservation conflict (e.g., a SCSI command). Such detecting includes the detection of an attempt to access shared storage 307 from a node 303 (computer system 210) that fails with a reservation conflict (i.e., when an I/O error occurs when the computer 210 is attempting to, e.g., write to the shared storage 307). As noted above, other types of SCSI commands can also fail with a reservation conflict, and the command failure detecting module 317 detects the failures of these commands as well as those of I/O attempts. When such an I/O (or other) error is detected, a registration determining module 319 of the reservation conflicts resolution manager 101 on that node 303 determines whether the node 303 is registered with its unique key 313 (as stored, e.g., in the dmp-node) for the shared storage 307 on which the reservation conflict occurred. The registration determining module 319 can use clustering and storage system 301 and SCSI-3 PR services to make this determination. In response to the node's key 313 not being registered for the shared storage 307, the registration determining module 319 determines that the I/O (or other) error occurred because the node 303 is fenced off from the shared storage 307. In this case, the reservation conflicts resolution manager 101 does not intervene, but instead allows the clustering and storage system 301 to process the error resulting from the I/O failure, so as to perform its default I/O fencing functionality.

The registration determining module 319 reaches the conclusion that the node 303 is fenced off as a result the node's key 313 not being registered for the shared storage 307 because, as noted above, SCSI-3 PR uses registration and reservation to implement I/O fencing, which is enabled in the clustering and storage system 301. Nodes 303 that participate register a key 313 with the shared storage 307. Each node 303 registers its own key 313, and registered nodes 303 can establish a reservation. Using this functionality for I/O fencing, blocking write access to fence off a node 303 and thus avoid split brain can be achieved by removing the node's registration from the shared storage 307. Registered nodes 303 can "eject" the registration of another member. A member wishing to eject another member issues a "preempt and abort" command. Ejecting a node 303 is final and atomic. Once a node 303 is ejected, it has no key 313 registered, and thus cannot eject other nodes 303. This effectively avoids the split-brain condition. Under SCSI-3 PR in the context of a storage environment supporting multipathing, a single node 303 can register the same key 313 for all paths to the shared storage 307. Thus, a single preempt and abort command blocks all I/O paths from the ejected node 303 to the shared storage 307. Therefore, if the node 303 that experienced the I/O failure does not have a key 313 registered with the shared storage 307, the registration determining module 319 can safely conclude that the I/O error occurred because the node 303 has been ejected, and is fenced off from the shared storage 307.

On the other hand, in response to determining that the node 303 does have a key 313 registered for the shared storage 307, the registration determining module 319 determines that the node 303 is not fenced off. As explained above, if the node 303 where fenced off from the shared storage 307, the node 303 would have been ejected from the registration membership and thus would no longer have a registration to the shared storage 307. Because the node 303 has its key 313 registered to access the shared storage 307, the registration determining module 319 can safely conclude that it is not fenced off, and thus treats the I/O failure as an indication to resolve the reservation conflict caused by, for example, a VM live migration. To resolve the reservation conflict, the node registering module 311 re-registers the node 303 on all paths to shared storage 307 using the node's unique key 313 stored, e.g., in the dmpnode. In embodiments in which a separate unique key 313 is used for each SCSI device underlying the shared storage 307, the node registering module 311 re-registers the node 303 for each individual SCSI device, using the appropriate stored key 313. This resolves any reservation conflicts resulting from, e.g., the live migration. An operation restarting module 321 of the reservation conflicts resolution manager 101 then restarts the failed operation (e.g., the failed I/O), which now executes properly because the reservation conflict has been resolved.

Note that the above-described operation of the reservation conflicts resolution manager 101 is platform, device and server independent, and resolves reservation conflicts resulting from live migrations (or other causes) in any cluster and storage environment utilizing SCSI-3 PR I/O fencing. By detecting and resolving the reservation conflicts, monitored applications 309 can remain available, without downtime. Furthermore, the reservations conflicts are detected automatically, and the re-registration is only executed when the node 303 is not fenced off. Therefore, unnecessary re-registrations are avoided, and reservations conflicts caused by unsuspected events are automatically detected and resolved. It is to be understood that although SCSI-3 PR is discussed herein, other embodiments can be implemented in the context of other standards for physically connecting and transferring data between computers and peripheral devices that provide similar registration, persistent reservation and I/O fencing features.

Figure 4:
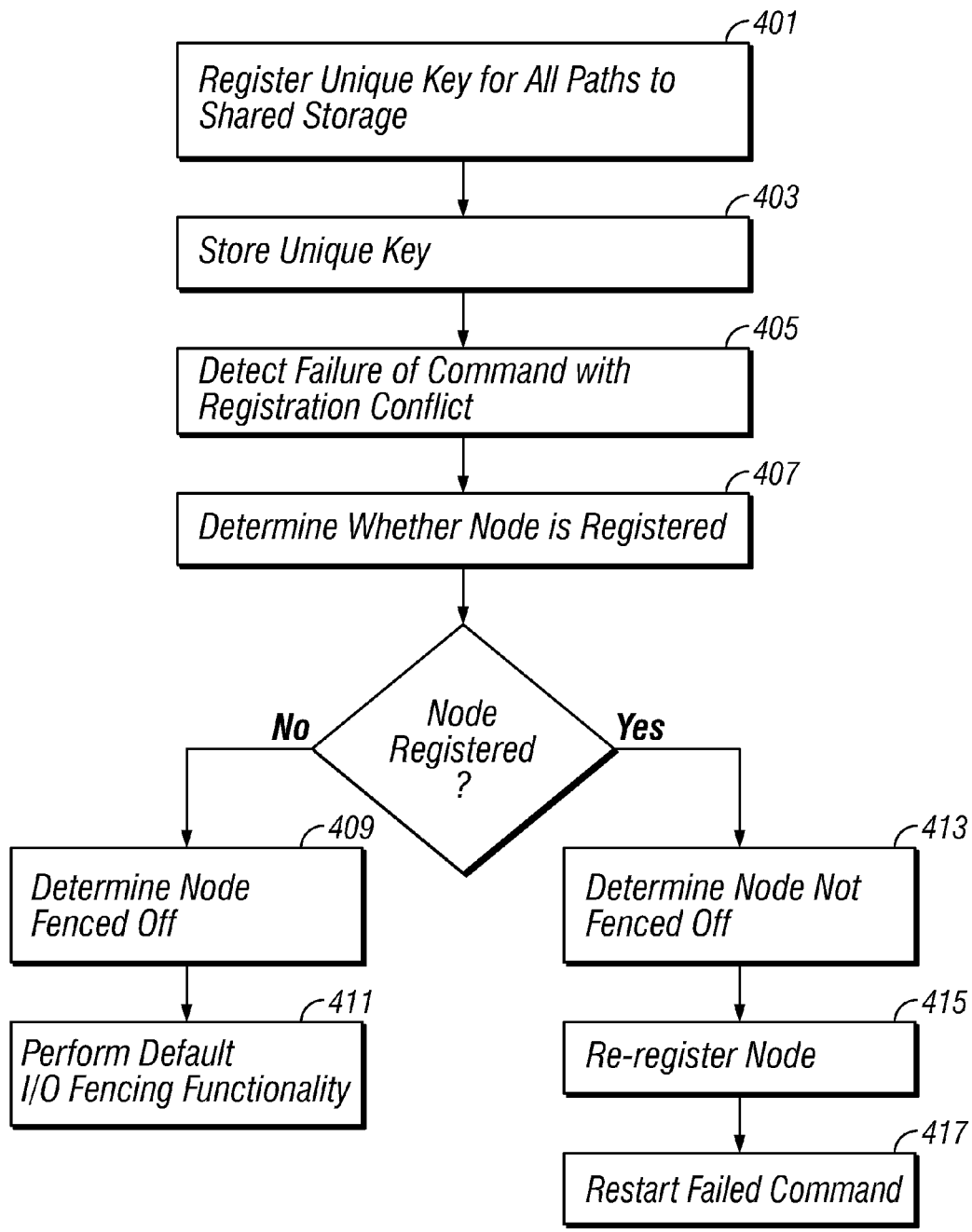
FIG. 4 is a flowchart illustrating steps of the operation of a reservation conflicts resolution manager, according to some embodiments.

FIG. 4 is a flowchart showing steps of the operation of the reservation conflicts resolution manager 101, according to some embodiments. The node registering module 311 registers 401 a unique key 313 for a specific node 303, for all paths to the shared storage 307. The key storing module 315 stores 403 the unique key 313 at a cluster 300 level. The command failure detecting module 317 detects 405 the failure of an attempt to access the shared storage 307 (or of a non I/O based SCSI command) from the specific node 303 due to a reservation conflict. The registration determining module 319 determines 407 whether the specific node 303 is registered with its unique key 313 for the shared storage 307. In response to the node's key 313 not being registered for the shared storage 307, the registration determining module 319 determines 409 that the error occurred because the node 303 is fenced off from the shared storage 307. In this case, the clustering and storage system 301 performs 411 its default I/O fencing functionality. On the other hand, in response to determining that the node 303 does have a key 313 registered for the shared storage 307, the registration determining module 319 determines 413 that the node 303 is not fenced off. In this case, in order to resolve the reservation conflict, the node registering module 311 re-registers 415 the node 303 on all paths to the shared storage 307 using the unique key 313. The restarting module 321 then restarts 417 the failed operation (e.g., the failed I/O operation).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for resolving reservation conflicts in a clustering and storage system comprising a plurality of nodes, wherein the clustering and storage system supports registration, persistent reservations and input/output (I/O) fencing, the method comprising the steps of:
   registering, for a node of the plurality of nodes on physical devices, all paths to shared storage of the clustering and storage system, with a key unique to each of the nodes;
   subsequent to live migrating of a virtual machine from a source node of the plurality of nodes to a target node of the plurality of nodes, detecting a command failure with a reservation conflict, resulting from an attempt to access the shared storage by the virtual machine from the target node rather than from the source node;
   responsive to determining that the target node is registered with the shared storage with its unique key, determining that the reservation conflict has occurred as a result of the live migrating of the virtual machine;
   determining whether the target node is registered with the shared storage with a unique key for the target node;
   responsive to determining that the target node is registered with the shared storage with the unique key, determining that the target node is not fenced off from the shared storage;
   re-registering the target node for all paths to the shared storage with the target node unique key, thereby resolving the reservation conflict; and
   restarting the failed command.

2. The method of claim 1 further comprising:
   multiple nodes of the plurality each registering for all paths to the shared storage of the clustering and storage system; and
   the multiple registered nodes forming a membership, wherein only registered nodes are able to access the shared storage.

3. The method of claim 2 wherein:
   the established membership is set to Write Exclusive Registrants Only (WERO), wherein only registered nodes are able to write to the shared storage.

4. The method of claim 2 further comprising:
   establishing a reservation amongst the membership to access the shared storage, wherein only one reservation exists amidst multiple registrations.

5. The method of claim 1 further comprising:
   for each one of the plurality of nodes, registering, for that node, all paths to the shared storage of the clustering and storage system, with a key unique to that node, such that each node of the plurality is registered with its own unique key for all paths to the shared storage.

6. The method of claim 1 further comprising:
   storing the key unique to the node, at a clustering and storage system wide level.

7. The method of claim 1 further comprising:
   subsequent to a second live migrating of a virtual machine from a second source node to a second target node of the plurality of nodes, detecting a second command failure with a reservation conflict, resulting from a second attempt to access the shared storage from the second target node;
   determining whether the second target node is registered with the shared storage with a unique key;
   responsive to determining that the second target node is not registered with the shared storage with the unique key, determining that the second target node is fenced off from the shared storage; and
   the clustering and storage system performing default I/O fencing functionality.

8. The method of claim 1 wherein registering, for a node, all paths to shared storage of the clustering and storage system, with a key unique to the node, further comprises:
   using a single key unique to the node to register the node for each of a plurality of physical storage devices underlying the shared storage.

9. The method of claim 1 further comprising:
   the clustering and storage system using Small Computer System Interface 3 Persistent Reservations (SCSI-3 PR) to support registration, persistent reservations and I/O fencing.

10. The method of claim 1 wherein registering, for a specific node, all paths to shared storage of the clustering and storage system, with a key unique to the node, further comprises:
    using a separate key unique to the node to register the node for each separate one of a plurality of physical storage devices underlying the shared storage.

11. The method of claim 1 further comprising:
    detecting a failure of an I/O operation with a reservation conflict, resulting from an attempt to access the shared storage from the node; and
    after re-registering the node for all paths to the shared storage, restarting the failed I/O operation.

12. At least one non-transitory computer readable-storage medium for resolving reservation conflicts in a clustering and storage system comprising a plurality of nodes, wherein the clustering and storage system supports registration, persistent reservations and input/output (I/O) fencing, the at least one non-transitory computer readable-storage medium storing computer executable instructions that, when loaded into computer memory and executed by at least one processor of a computing device, cause the computing device to perform the following steps:
    registering, for a node of the plurality of nodes, all paths to shared storage of the clustering and storage system, with a key unique to each of the nodes;
    subsequent to live migrating a virtual machine from a source node of the plurality of nodes to a target node of the plurality of nodes, detecting a command failure with a reservation conflict, resulting from an attempt to access the shared storage by the virtual machine from the target node rather than from the source node;
    responsive to determining that the target node is registered with the shared storage with its unique key, determining that the reservation conflict has occurred as a result of the live migrating of the virtual machine;
    determining whether the target node is registered with the shared storage with a unique key for the target node;

responsive to determining that the target node is registered with the shared storage with the unique key, determining that the target node is not fenced off from the shared storage;

re-registering the target node for all paths to the shared storage with the target node unique key, thereby resolving the reservation conflict; and restarting the failed command.

13. The at least one non-transitory computer readable-storage medium of claim 12 further storing computer executable instructions to perform the following additional steps:

multiple nodes of the plurality each registering for all paths to the shared storage of the clustering and storage system; and the multiple registered nodes forming a membership, wherein only registered nodes are able to access the shared storage.

14. The at least one non-transitory computer readable-storage medium of claim 13 wherein:

the established membership is set to Write Exclusive Registrants Only (WERO), wherein only registered nodes are able to write to the shared storage.

15. The at least one non-transitory computer readable-storage medium of claim 13 further storing computer executable instructions to perform the following additional step:

establishing a reservation amongst the membership to access the shared storage, wherein only one reservation exists amidst multiple registrations.

16. The at least one non-transitory computer readable-storage medium of claim 12 further storing computer executable instructions to perform the following additional step:

for each one of the plurality of nodes, registering, for that node, all paths to the shared storage of the clustering and storage system, with a key unique to that node, such that each node of the plurality is registered with its own unique key for all paths to the shared storage.

17. The at least one non-transitory computer readable-storage medium of claim 12 further storing computer executable instructions to perform the following additional step:

storing the key unique to the node, at a clustering and storage system wide level.

18. The at least one non-transitory computer readable-storage medium of claim 12 further storing computer executable instructions to perform the following additional steps:

detecting a second command failure with a reservation conflict, resulting from a second attempt to access the shared storage from the node;

responsive to detecting the second command failure, determining whether the node is registered with the shared storage with its unique key;

responsive to determining that the node is not registered with the shared storage with its unique key, determining that the node is fenced off from the shared storage; and the clustering and storage system performing its default I/O fencing functionality.

19. The at least one non-transitory computer readable-storage medium of claim 12 further storing computer executable instructions to perform the following additional step:

the clustering and storage system using Small Computer System Interface 3 Persistent Reservations (SCSI-3 PR) to support registration, persistent reservations and I/O fencing.

20. A computer system for resolving reservation conflicts in a clustering and storage system comprising a plurality of nodes, wherein the clustering and storage system supports registration, persistent reservations and input/output (I/O) fencing, the computer system comprising:

a processor; and a memory, comprising:

a first module to register, for a node of the plurality of nodes, all paths to shared storage of the clustering and storage system, with a key unique to each of the nodes;

a second module to, subsequent to live migrating of a virtual machine from a source node of the plurality of nodes to a target node of the plurality of nodes, detect a command failure with a reservation conflict, resulting from an attempt to access the shared storage by the virtual machine from the target node rather than from the source node;

a third module to, responsive to determining that the target node is registered with the shared storage with its unique key, determine that the reservation conflict has occurred as a result of the live migrating of the virtual machine;

a fourth module to determine whether the target node is registered with the shared storage with a unique key for the target node;

a fifth module to, responsive to determining that the target node is registered with the shared storage with the unique key, determine that the target node is not fenced off from the shared storage;

a sixth module to re-register the target node for all paths to the shared storage with the target node unique key, thereby resolving the reservation conflict; and a seventh module to restart the failed command.

* * * * *